United States Patent [19]

Durand et al.

[11] 4,100,427
[45] Jul. 11, 1978

[54] DEVICE FOR CONVERTING SOLAR ENERGY

[75] Inventors: Henri Durand, Paris; Geert Jan Naaijer, Limeil-Brevannes, both of France

[73] Assignee: U.S. Philips Corporation, New York, N.Y.

[21] Appl. No.: 734,995

[22] Filed: Oct. 22, 1976

[30] Foreign Application Priority Data

Oct. 31, 1975 [FR] France .................. 75 33378

[51] Int. Cl.² .............................................. H02J 1/10
[52] U.S. Cl. ...................................... 307/87; 307/66; 307/130; 318/430; 361/31; 136/89 AC
[58] Field of Search .................. 307/52, 85, 86, 87, 307/39, 25, 24, 23, 21, 20, 19, 131, 130, 125, 117, 64, 65, 66; 318/139, 434, 430; 323/9; 361/30, 31; 136/89 AC

[56] References Cited

U.S. PATENT DOCUMENTS

| | | | |
|---|---|---|---|
| 3,317,809 | 5/1967 | Bowers | 307/66 |
| 3,419,779 | 12/1968 | Zehner | 307/66 |
| 3,489,915 | 1/1970 | Engelhardt | 307/66 |
| 3,696,286 | 10/1972 | Ule | 307/66 |

Primary Examiner—Robert K. Schaefer
Assistant Examiner—William L. Feeney
Attorney, Agent, or Firm—Frank R. Trifari

[57] ABSTRACT

A device is described for converting solar energy into electric power for a load, which device is provided with photocells and electric accumulators. Switching means are provided which at least during starting of the load connect this load to the output terminals of the array of photocells so that during starting the current through the load is determined by the current supplied by the photocells. The device makes efficient use of the available solar radiation, is of simple design and is reliable.

9 Claims, 10 Drawing Figures

DEVICE FOR CONVERTING SOLAR ENERGY

The invention relates to a device for converting solar energy into electric energy for supplying a load which exhibits an in-rush effect. The device is provided with photocells for converting the solar energy into electric energy and with electric accumulators which can store the energy supplied by the photocells.

Such a device is known from French Patent Specification No. 2,041,243. This Patent Specification describes an automatic system for adapting a d.c. generator with variable characteristics (photocells) to a load.

In a device of the type mentioned in the preamble the accumulators are charged by the solar cells during the day. The energy thus stored is utilized for driving an electric motor, for example the motor of a water pump in very sunny and dry regions. The stored energy may be employed for numerous other purposes such as for lighting by means of incandescent lamps.

In devices which employ solar energy an energy accumulator is necessary owing to the irregular character of the energy received from the sun. This radiation energy exhibits a daily cyle and furthermore depends on climatological conditions. In the case of solar cell arrays which are stationarily disposed or which have different orientations for different seasons, the radiation energy which is received depends on the inclination factor of the sun relative to the vertical of the arrays. The electrical energy supplied by a photoelectric generator thus exhibits variations as a function of time, which makes certain applications difficult or even impossible if no storage unit is provided for the energy which is produced.

The electrical resistance of a d.c. motor which is used, for example, in a device in which solar energy is utilized for pumping water is kept as low as possible so as to minimize losses owing to the Joule effect and to achieve maximum efficiency. The accumulator will then supply a large in-rush current which has an adverse effect on the lifetime of certain elements of the device.

In order for the motor to start smoothly known devices are equipped with current limiting circuits. The use of such circuits may present problems. Moreover, such circuits also consume power.

It is an object of the present invention to provide a device of the type mentioned in the preamble which does not have the above-mentioned drawbacks, which is of simple design and is reliable, has a high efficiency and operates the load smoothly.

The device according to the invention is therefore characterized in that the number of photocells and their arrangement is sufficient to provide a peak power and a peak photocell current which under optimum insolation is equal to or is slightly greater than the nominal power and the nominal current, respectively, of the load, and that the device comprises detection and switching means for connecting the load during the load starting period to the output of the array of photocells only. As a result, during starting the current through the load is determined only by the current supplied by the photocells.

According to the invention use is made of the fact that the photocells can be employed as current sources. As long as the voltage across the photocells remains below a specific value, these cells supply a substantially constant current which is independent of the voltage across the cells. When the load, for example a motor, is switched on the photocells limit the current supplied to the load and when the motor reaches its nominal speed it is connected to the accumulators.

The invention will now be described in more detail with reference to the drawing, in which:

FIG. 1c represents electrical parameters of the device of FIG. 1a,

FIG. 2 illustrates the operation of the device of FIG. 1a,

Figure 1A:
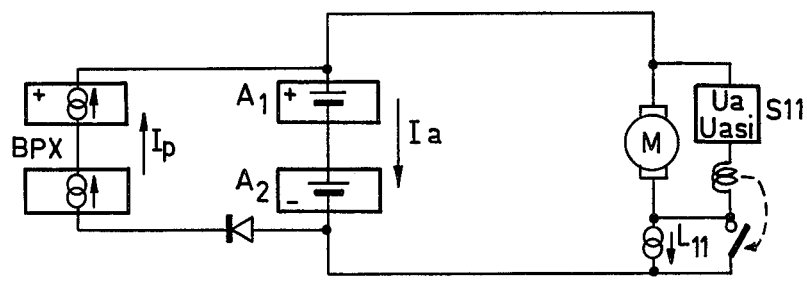
FIG. 1a shows a known device which is provided with a current limiting circuit.

In the known device of FIG. 1a the load, which consists of a motor M, is connected directly to the terminals of the accumulators $A_1$ and $A_2$. Starting of the motor, which in the case where the device is utilized for pumping water out of a well, coincides with the start of a pumping cycle, is controlled by the state of charge of the accumulators, i.e. by the accumulator voltage $Ua$. The motor/pump assembly is started before the accumulator is overcharged (the upper value of $Ua$ $Uass$).

A pumping cycle is terminated when the voltage across the accumulators drops below a lower threshold voltage $Uasi$. The accumulator voltage is detected by the system $S_{11}$, which system ensures that the limiting circuit $L_{11}$ is rendered operative upon starting and is short-circuited after the in-rush starting period.

Figure 1B:
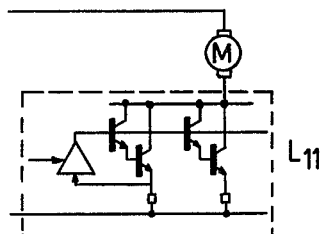
FIG. 1b shows an example of such a current limiting circuit.

The current limiting circuit $L_{11}$ may consist of resistors with progressively decreasing values, an automatic rheostat, or a circuit with several parallel-connected power transistors, as shown in FIG. 1b.

Figure 1C:
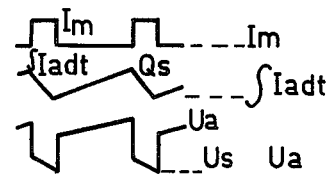

FIG. 1c represents the current $Im$ through the motor, the accumulator charge $Q = \int Ia \, dt$ (where $Ia$ is the current through the accumulators), and the voltage $Ua$ across the accumulators, all as a function of time. When the accumulator charge reaches the value $Qs$, i.e. when its voltage $Ua$ reaches the value $Uass$, the motor is started. When the accumulator voltage has decreased to the lower level $Us$ (i.e. $Uasi$ in FIG. 1a) a pumping cycle is terminated. The circuit S11 detects when the charge $Q_s$ is reached and activates the current limiter L11 and with the switch contact open. The circuit S11 also short circuits current limiter L11 after the in-rush period by closing the switch contact in parallel therewith. If the accumulator voltage drops below the value $Uasi$, the circuit S11 opens the switch contact and makes the current limiter inoperative so that no current can flow thru it.

Figure 2:
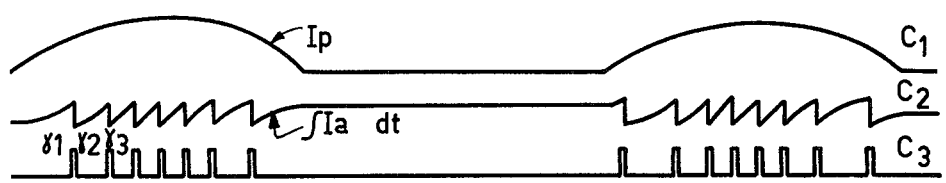

The operation of the device of FIG. 1a as a function of time is illustrated in FIG. 2. In this Figure:

the curve $C_1$ represents the variation of the total current $Ip$ supplied by the photocells BPX;

$C_2$ represents the charging periods of the accumulators, and $C_3$ represents the pumping cycles $\gamma_1, \gamma_2, \gamma_3$ etc.

FIG. 2 clearly shows the intermittent character of the operation of said device. The peak power which is supplied by the photocells is smaller than the nominal power demand of the load, specifically if the load consists of a motor pump.

The effective daily duration of intermittent pumping (and thus the daily output) is proportional to the number of photocell arrays. The pump which is energized by the device of FIG. 1a generally operates for a comparatively short time. In the case of intensive solar radiation the motor is started many times a day. The current limiting system $L_{11}$ in FIG. 1a will consume power each time that the motor is started. This power consumption constitutes a pure loss. Moreover, the current limiting system becomes more intricate when higher reliability is required.

It might be considered advantageous to dispense with the current limiting system. However, in that case the switching circuits, the load and the accumulators will be subjected to large in-rush currents. Furthermore, certain motor elements will be heated owing to the large in-rush currents each flowing time that the motor is started, which has an adverse affect on these elements.

In accordance with the invention the load is connected to the terminals of the photocells only during the in-rush starting period. In that case it is not necessary to employ a current limiting system. This is because a photocell may be regarded as a generator which supplies a constant current if the voltage remains below a specific threshold voltage, which voltage will be referred to as the "knee voltage" hereinafter (see $U_c$ in FIG. 7). For a voltage higher than the knee voltage the current supplied by the photocell decreases rapidly. Furthermore, the current supplied by the photocells depends on the illumination.

Figure 3A:
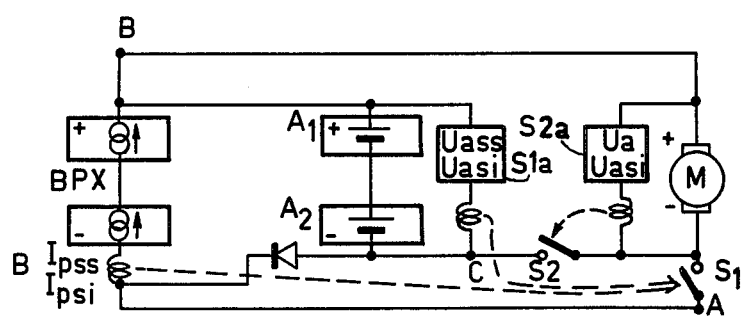
FIGS. 3a, 3b and 4 show embodiments of a device in accordance with the invention.
Figure 3B:
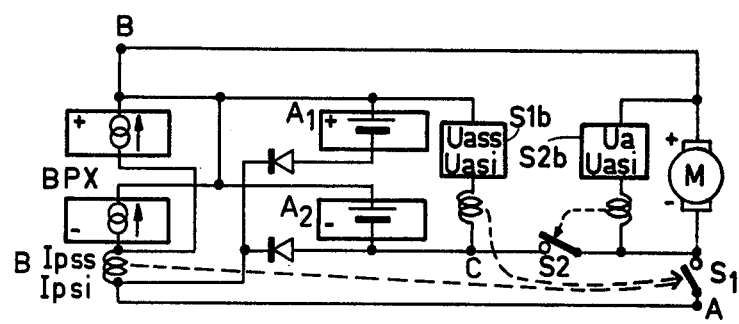
Figure 4:
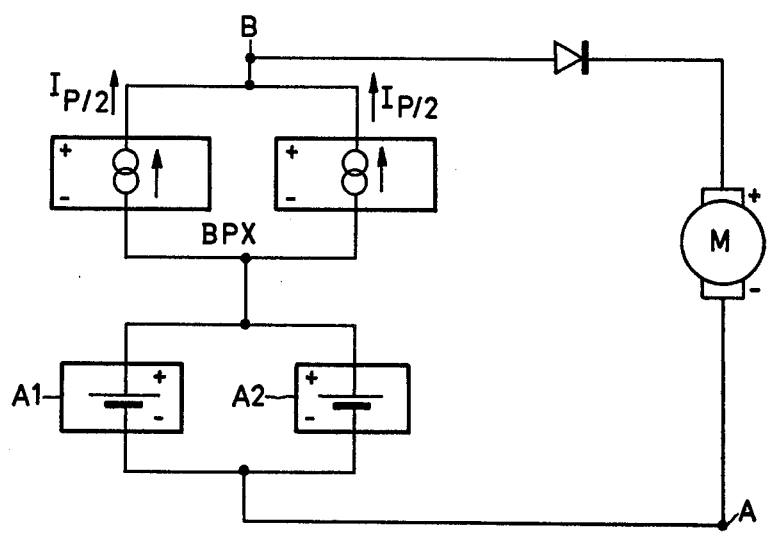

In the devices of FIGS. 3a, 3b and 4 the accumulators are connected to the photocells via diodes.

The diodes between the photocells and the accumulators have different functions:

The accumulator cannot discharge via the photocell; thus the stored energy cannot return to the photocells as a pure loss.

During the in-rush starting period of the motor the diodes are cut off and the motor voltage, which is proportional to the motor speed, can initially be very low. The accumulators are then temporarily disconnected during this period.

When changing from a series connection of the accumulators (for example 24 V) to a parallel connection (12 V), the two diodes will prevent an excessive current surge between the two accumulator branches if these are not correctly balanced.

Because the peak current supplied by the photocell arrays in the case of optimum insolation has been selected not lower than the nominal current consumed by the load (for example a water-pump motor), the operation is substantially continuous. In the case where the accumulators are fully charged and the photocell arrays supply a current which is smaller than the starting current of the load, which may happen in particular when the solar radiation is still weak (generally every morning), the accumulators cannot be overcharged because the relay contact $S_1$ is closed. This contact is closed when the control system $S_{1a}$ (or $S_{1b}$) detects an accumulator voltage which is higher than a threshold voltage $U_{ass}$. The current supplied by the photocells can then be passed through the motor, so that overcharging of the accumulators is avoided.

Normally, contact $S_1$ closes when the photocurrent $I_p$ reaches the upper threshold value $I_{pss}$. However, if the accumulator voltage $U_A$ is below the value $U_{asi}$, then contact $S_1$ remains open even if the photocell current $I_p$ exceeds the value $I_{pss}$. This allows the battery to regain its normal state of charge more rapidly.

In this case it may often be desirable to allow the load (for example the motor of a water-pump) to start until a nominal speed is reached. This can be realized with the arrangement of FIG. 4. In this arrangement the load can also operate if the solar radiation is weak, e.g. half the above mentioned optimum value. The arrangement of FIG. 4 can be obtained from that of FIG. 3b with the aid of conventional automatic switching means which can be made to respond to the insolation level. In FIG. 4 two photocell arrays are connected in parallel with each other, and so are the accumulators. The two groups of power elements are connected in series with the load, preferably via a semiconductor diode.

When the motor starts the voltage across the motor is very low because the back e.m.f. of the motor is very small due to its low initial speed. For example at an internal resistance of the motor, $r = 0.1\ \Omega$, and a current $I_m = I_p = 10$ A, the motor voltage, $U_{motor} = 1$ V. In FIG. 4 the voltage at point B relative to the voltage at point A is then for example 2 V. The potential difference across the accumulators which are charged and connected in parallel will be 12 V. The voltage across the photocells is then 10 V but negative. The operating point of the photocells is then located in the quadrant $Q_2$ in FIG. 7. In the case of FIG. 3b, however, the operating point of the photocells during starting is located in the quadrant $Q_1$ near zero voltage.

The motor, whose torque depends on the current through the motor, starts and then gains speed. A back e.m.f. is produced which is roughly proportional to motor speed and increases to a value of for example 23 V, which voltage is attained when the motor operates at the nominal speed. At the same time the operating point of the photocells moves towards the quadrant $Q_1$ until the intersection is reached of the curve which represents the current supplied by the photocells as a function of the insolation with the approximately straight load line (see the dashed horizontal line in FIG. 7).

In the arrangement of FIG. 4 the load can also start and subsequently operate normally, i.e. rotate with the nominal motor speed, if the current $I_{pp}$ which is supplied by each photocell array is small. In the case of two photocell arrays $I_{pp}$ may be half the nominal current through the motor. Moreover, depending on the illumination the number of parallel connected accumulators and photocell arrays can be increased so that the current $I_{pp}$ may be reduced even further.

After the starting period has elapsed changeover is possible from the arrangement of FIG. 4 to the arrangement of FIG. 3a or 3b by means of conventional switching means.

The switching systems of FIGS. 3a and 3b comprise threshold detectors $S_{1a}$, $S_{2a}$ or $S_{1b}$, $S_{2b}$. These threshold detectors may be operational amplifiers or simple coils which switch the relays $S_1$, $S_2$.

Such a switching system operates as follows: $S_1$ is closed either in the case that the accumulators are fully charged and the photocell arrays supply a total current $I_p$ which is smaller than the starting current of the load, or in the case that the current through the current detector B exceeds an upper threshold current $I_{pss}$, i.e. if the photocells are adequately exposed to solar radiation and supply a current comparable to the nominal motor current. $S_2$ is closed when the motor speed is correct (stationary operation), the voltage across the motor (Um) then being approximately equal to the accumulator voltage (Ua). $S_1$ opens if the current becomes smaller than a lower threshold current Ipsi. Subsequently, $S_2$ can be opened once the accumulator voltage which is then approximately equal to the motor voltage, has attained the lower threshold Uasi, so that the accumulators are protected against too low a state of charge. In the parallel arrangement of FIG. 3b, the voltage across both the photocells and the accumulators is half the voltage across the series arranged photocells and accumulators of FIG. 3a. Consequently, the motor speed is then half the speed it was in the case of a series-connection. In the arrangement of FIG. 3b the pump can be started when the amount of solar radiation is half the amount of solar radiation necessary to enable the motor to start in the arrangement of FIG. 3a. The torque of the motor pump assembly is substantially proportional to the current. In the case of FIG. 3b the motor rotates at half the speed, while the efficiency is only slightly lower than in the case of FIG. 3a.

Figure 5:
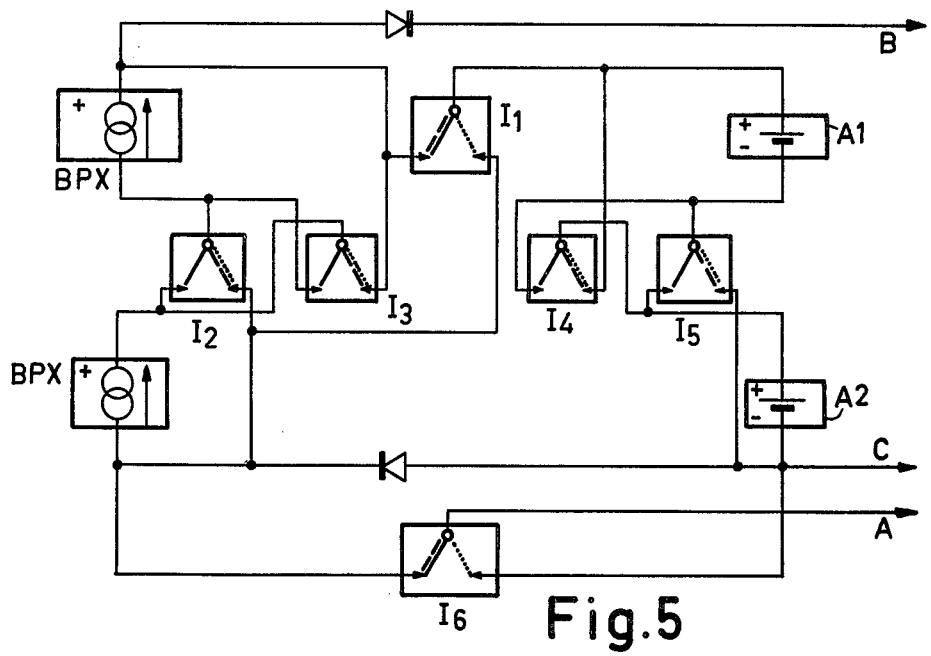
FIG. 5 shows an example of a switching system for a device in accordance with the invention.

FIG. 5 by way of example shows the apparatus by means of which switching is possible from one of the arrangements of FIGS. 3a, 3b and 4 (series arrangement, parallel arrangement, and series-parallel arrangement) to another of these arrangements. In the diagram of FIG. 5 the points A, B and C correspond to the points A, B and C of FIGS. 3a, 3b and 4. The arrangement of FIG. 3a corresponds to the positions of the switches $I_1$ through $I_6$ represented by the solid lines. The arrangement of FIG. 3b corresponds to the switch positions represented by the dashed lines. If the switches $I_1$ through $I_6$ are in the positians represented by the dotted lines the arrangement of FIG. 4 is obtained. It is obvious that all the switches should be operated simultaneously by one switching command signal. The switches of FIG. 5 can be controlled automatically, for example, by means of a solenoid operated in response to a system parameter such as the insolation level.

The conditions for switching between the various arrangements will be described later on with reference to FIG. 7.

With respect to the choice between the various arrangements as a function of the amount of solar radiation which is received, for example if two photocell arrays are available, the following is to be noted:

If the solar radiation is such that one photocell array supplies a current Ipp which at least equals the nominal motor current Im, the arrangement of FIG. 3a is opted for. Starting and operation of the load is then guaranteed. If the load is constituted by a motor, allowance being made for the selected characteristics, the motor will rotate at the nominal speed after the starting period because the nominal voltage appears across the motor.

If Ipp equals Im/2 or is greater than Im/2 but smaller than Im, a starting circuit may be designed in accordance with FIG. 3b or FIG. 4. The d.c. motor will then receive the nominal current required for starting.

In the case of FIG. 3b the motor speed will be half the nominal speed and the charge of the accumulators will not decrease.

In the case of FIG. 4 the charge of the accumulators will decrease. However, the motor speed tends to increase to the nominal speed. The arrangement of FIG. 4 enables the motor to be started and brought to its nominal speed in the case of weak solar radiation.

Figure 6:
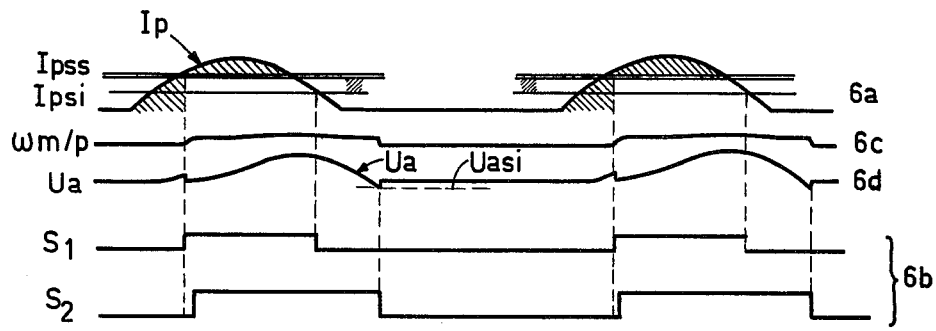
FIG. 6 illustrates the operation of a device in accordance with FIG. 3a or 3b.

The diagram of FIG. 6 shows how an arrangement in accordance with FIG. 3a or 3b operates as a function of time. In FIG. 6 a period of approximately two days has been plotted. The curve Ip gives the total current supplied by the photocells. During the night the current is 0. During the day the current first exceeds a first level Ipsi and subsequently it exceeds a second level Ipss. In the afternoon the current may sometimes decrease, e.g. clouds may change the photocell current.

If the current is greater than Ipss starting of the motor is ensured. If the current is smaller than Ipss, relay $S_1$ is closed by the accumulator voltage when it exceeds the upper level, Uass, starting then is possible within a specific range of currents. It is obvious that starting is impossible when the photocell current is too small.

The periods during which the relays $S_1$ and $S_2$ are open and closed are shown in FIG. 6b. The upper level means that a relay is closed.

In FIG. 6c the speed of the motor pump assembly (wmp) has been plotted. In one embodiment of a device in accordance with the invention a permanent-magnet d.c. motor was employed because of the efficiency and specific power. The speed Wmp was then substantially proportional to the voltage Um.

The motor which was used had the following characteristics:
nominal voltage 24 V
power 400 W
nominal speed 1500 r.p.m.

The fixed losses are not significant (80% efficiency). It is for example possible to couple a piston pump to this motor via a reduction gear, which pump operates satisfactorily within a wide range of speeds and pumping depths (at least down to 60 m depth with good efficiency).

FIG. 6d shows the variation of the voltage across the accumulators. These accumulators store the surplus energy. At sunset or when the sky is temporarily clouded the stored energy is supplied to the motor.

In this embodiment of the present device conventional accumulators are utilized having a comparatively low self-discharge rate. An accumulator battery for example comprises four accumulators which in a series-arrangement are all four connected in series and which in a parallel arrangement are connected in two parallel groups of two accumulators in series.

Figure 7:
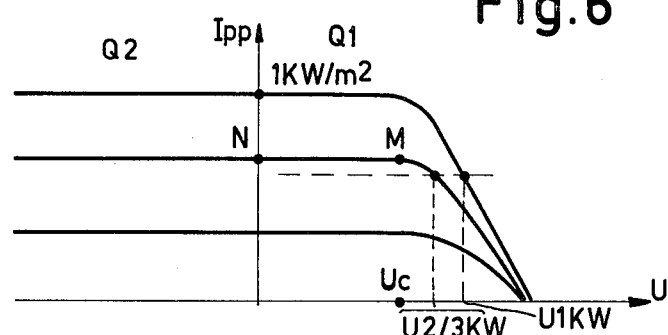
FIG. 7 shows a current-voltage characteristic.

The curves in FIG. 7 represent the current supplied by a photocell array as a function of the voltage across the photocells. The various curves apply to different intensities of the solar radiation (1 kW/m$^2$, $\frac{2}{3}$ kW/m$^2$, $\frac{1}{3}$ kW/m$^2$). FIG. 7 furthermore shows the knee voltage Uc (corresponding to point M) and the voltages corresponding to the intersections of the curves with the load line, which in the ideal case is a horizontal straight line (shown as a dashed line).

As particularly in the case of a piston pump (specifically when a correctly proportioned flywheel is used) the torque to be produced by the motor (permanent magnet d.c. motor) is substantially constant and virtually independent of the speed for a given pump installation during stationary operation, the current through the motor is substantially constant and virtually independent of the motor voltage. In FIG. 7 this is represented by the idealized straight load line of the motor-pump system. FIG. 7 is divided into quadrants $Q_1$ and $Q_2$. Beginning with the arrangement of FIG. 4, if one of the curves is traced starting from $Q_2$, point N will be reached where the voltage across the photocell array is zero. At this point it is possible to change over from the arrangement of FIG. 4 to the arrangement of FIG. 3b.

At point M it is possible to change over to the arrangement of FIG. 3a. In other words, the parameter for controlling the switches $I_1 - I_6$ of FIG. 5 may be the photocell voltage. Means for detecting the photocell voltage may then be provided which switches the switches $I_1 - I_6$ to rearrange the configuration of photocells and accumulators. For example, if said voltage is negative, the detecting means switches the switches $I_1 - I_6$ to set up the configuration of FIG. 4. In the range from 0 volts to the knee voltage, $U_c$, the arrangement of FIG. 3b is set up, whereas for photocell voltages greater than $U_c$ the arrangement of FIG. 3a is switched in.

Furthermore, it will be evident from FIG. 7 that without accumulators a substantial surplus of current $I_p$ (and thus of power), which is available in principle, only yields a comparatively small increase of the motor voltage, thus of the motor speed and consequently of the effective motor power.

By using an accumulator battery all the surplus current $I_p$ is temporarily stored. The nominal battery voltage has been selected slightly below the knee voltage (i.e. paint M in FIG. 7) of the photocells. The curves shown in FIG. 7 are typically those of silicon photocells. The electrical energy stored in the accumulator battery is delivered during the period in which the current $I_p$ has decreased to a value smaller than the nominal current through the motor. The capacity of the battery is adapted to the periodically available surplus of ampere-hours.

In an embodiment of the device which was equipped with a motor of approximately 400 W, the peak power supplied by the photocells was equal to or slightly higher than 400 W.

The present device for converting solar radiation into motor energy has the following advantages:

Owing to the absence of a separate current limiting system it is of simple design.

As a result of this, better use is made of the available energy and the reliability of the device is high.

The device is furthermore cheap and enables the motor to operate smoothly.

The invention has been described on the basis of a power supply for a water pump. However, numerous other applications of the invention are conceivable. In particular the supply of power to a load which exhibits switching transients is to be mentioned in this respect.

What is claimed is:

1. In a device for converting solar energy into electric energy to be supplied to a load of the type which exhibits an in-rush effect, the improvement comprising, a plurality of photocells for converting solar energy into electric energy, a plurality of electric accumulators for storing electric energy supplied by the photocells, the number of photocells being sufficient to provide a peak power and a peak photocell current which under optimum insolation is equal to or is slightly greater than the nominal power and the nominal current, respectively, of the load, means for coupling the photocells to the accumulators and the load, switching means for connecting the load, during the load starting period, to the photocells only so that the load current then is determined only by the photocell current, and detection means responsive to photocell current, load voltage and accumulator voltage for controlling the operation of said switching means.

2. A device as claimed in claim 1 further comprising second switching means responsive to an electric parameter associated with the photocells for selectively interconnecting the photocells and accumulators in series, in parallel, or in series-parallel circuit configurations as a function of said electric parameter.

3. A device as claimed in claim 1 wherein the load comprises an electric motor and said switching means includes first and second switching contacts connected respectively in a first series circuit that includes the photocells and the motor and in a second series circuit that includes the accumulators and the motor, said detection means being operative to control the switching means to close the first switching contact and open the second switching contact during the motor starting period when the in-rush effect occurs and then to close the second switching contact when the in-rush effect is terminated.

4. A power supply system comprising, first and second arrays of photocells for converting solar energy into electric energy, first and second electric accumulator means coupled to said first and second arrays of photocells, means for coupling a load to said photocell arrays and to said accumulator means, the number of photocells and their interconnections being arranged to provide a peak power and a peak photocell current which under optimum insolation is equal to or is slightly greater than the nominal power and the nominal current, respectively, of the load, detection means responsive to photocell current and load voltage, and switching means controlled by the detection means for connecting the load to the photocell arrays while simultaneously isolating the load from the accumulator means during a start-up period of the load whereby the load start-up current is limited to the current supplied by the photocells.

5. A power supply system as claimed in claim 4 wherein said detection means includes means for controlling the switching means to connect the load to the first and second accumulator means subsequent to the start-up period and for disconnecting the load from the photocell arrays below a given value of the photocell current.

6. A power supply system as claimed in claim 4 wherein said detection means is also responsive to the voltage of the accumulator means to control the switching means to connect the load to the photocell arrays above a given value of the accumulator voltage.

7. A power supply system as claimed in claim 6 wherein said detection means includes means responsive to the load voltage for controlling the switching means to connect the load to the first and second accumulator means subsequent to the start-up period and means responsive to the photocell current for disconnecting the load from the photocell arrays below a given value of the photocell current.

8. A power supply system as claimed in claim 4 wherein said switching means includes first and second switch contact means for selectively connecting the load to the photocell arrays and to the accumulator means, respectively, said detection means also including means responsive to the voltage of the accumulator means for controlling the switching means to close and open the first switch contact means above and below first and second given values of the accumulator voltage, respectively, said detection means including means responsive to the photocell current for controlling the switching means to close and open the first switch contact means above and below first and second given values of the photocell current, respectively, and said detection means further includes means responsive to the load voltage for controlling the switching means to close and open the second switch contact means above and below first and second given values of the load voltage, respectively.

9. A power supply system as claimed in claim 4 wherein the load comprises a motor or similar device and said switching means includes first and second switch contact means for selectively connecting the load to the photocell arrays and to the accumulator means, respectively, said detection means including means responsive to the voltage of the accumulator means and the photocell current for controlling the switching means to operate said first switch contact means as a function of the accumulator voltage and the photocell current, respectively, said detection means also including means responsive to the load voltage for controlling the switching means to operate said second switch contact means as a function of the load voltage.

* * * * *